Dec. 23, 1969     B. LONG     3,485,614
PROCESS FOR REDUCING THE THICKNESS OF FLOAT
GLASS BY DIFFERENTIATED COOLING
Filed May 23, 1967     3 Sheets-Sheet 1
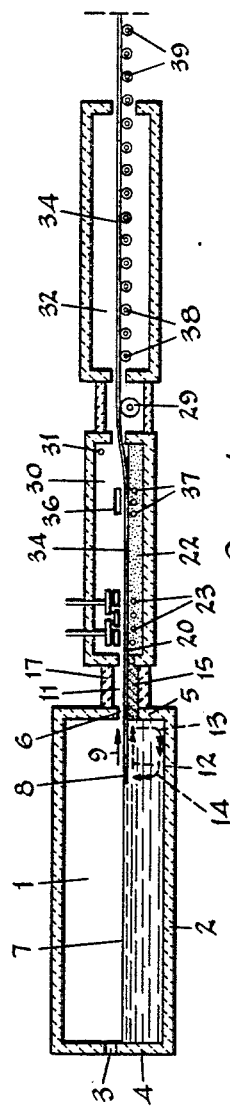
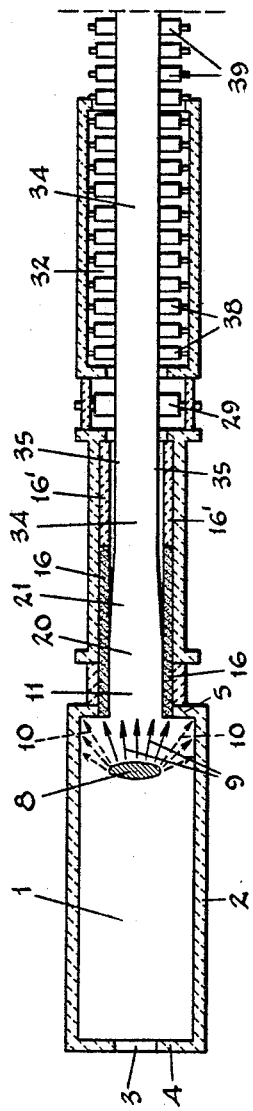
INVENTOR.
Bernard Long
BY
Nobbe & Swope
ATTORNEYS INVENTOR.
Bernard Long
BY
Nobbe & Swope
ATTORNEYS Dec. 23, 1969  B. LONG  3,485,614
PROCESS FOR REDUCING THE THICKNESS OF FLOAT
GLASS BY DIFFERENTIATED COOLING
Filed May 23, 1967  3 Sheets-Sheet 2

INVENTOR.
Bernard Long
BY
Hobbe & Swope
ATTORNEYS

3,485,614
PROCESS FOR REDUCING THE THICKNESS OF FLOAT GLASS BY DIFFERENTIATED COOLING

Bernard Long, Paris, France, assignor to Libbey-Owens-Ford Glass Company, Toledo, Ohio, a corporation of Ohio
Continuation-in-part of application Ser. No. 405,356, Oct. 21, 1964. This application May 23, 1967, Ser. No. 646,138
Claims priority, application France, Nov. 28, 1963, 955,399
Int. Cl. C03b 18/02
U.S. Cl. 65—99     9 Claims

ABSTRACT OF THE DISCLOSURE

Producing a continuous glass sheet by flowing a current of surface glass in a thin layer along a channel from a hot spot in a furnace onto a bath of molten metal. As the layer reaches the molten metal bath, its margins are cooled to a greater extent than its central region, and it is drawn longitudinally across the surface of the molten metal while still in a softened condition whereby the central region is reduced in thickness substantially below the cooled margins.

---

This application is a continuation-in-part of the now abandoned application Ser. No. 405,356, filed Oct. 21, 1964.

The present invention concerns the manufacture of a continuous glass sheet of uniform thickness included between about 2 and 6 millimeters, and whose surfaces possess a "fire polish" as well as an excellent planimetry.

At the present time the continuous glass sheets which satisfy the above thickness condition are generally produced by vertical drawing with or without bending. Their surfaces do indeed possess "fire polish" but their planimetry, which up to the present has been judged acceptable for many applications is, however, far from being excellent. It is subject to waves (striations, hammering effect, etc.) more or less troublesome.

It has already been proposed to produce a continuous sheet with a thickness of less than 6 millimeters by drawing horizontally a continuous sheet possessing "fire polish" and an excellent planimetry, but it must be emphasized that in this process the continuous sheet to be drawn necessarily is derived from a crude continuous sheet which has been "calibrated" between two cooled solid rollers and then subjected to a thermal treatment on a bath of molten metal. In other words, in this prior process one does not form continuous sheets having a "fire polish" and a thickness less than 6 millimeters directly from liquid glass.

It is evident that the necessity of putting the liquid glass into an intermediate form of a "calibrated" continuous sheet with diffused surfaces constitutes a serious inconvenience.

On the other hand, it has still not been clearly proved that it is possible in accordance with this prior process to produce a continuous sheet with a thickness of less than 3 millimeters whose surfaces possess "fire polish" as well as an excellent planimetry.

The present invention has for its object a new process of manufacture of a continuous glass sheet of less than equilibrium thickness, that is, with a thickness included between approximately 2 and 6 millimeters, by horizontal drawing, its surfaces possessing a "fire polish" as well as an excellent planimetry. The process has the advantages of avoiding surface planimetry defects (waves) of continuous sheets currently obtained by vertical drawing, as well as the complication of the process based on the intermediate stage of a "calibrated" continuous sheet with diffused surfaces.

The process of the present invention makes it possible to produce a continuous sheet having the previously mentioned characteristics, directly from liquid glass.

This process consists:

(1) In causing the major part of refined glass, which at the surface of a tank furnace moves from the "hot spot" towards the less hot walls, to enter into a horizontal canal, whose walls it does not wet, while its viscosity is less than 500 C.G.S. units (poises).

(2) In rapidly orienting the lines of current of this glass layer having great mobility and a small thickness parallel to the axis of the canal, while at the same time maintaining a uniform thickness across its whole width.

(3) In cooling intensely the marginal edges of the current and to a lesser extent the rest of its width so as to form two marginal zones of low viscosity, exceeding about $10^9$ C.G.S. units, with between them a central zone of definitely lower viscosity, less than about $10^7$ C.G.S. units.

(4) In thinning uniformly this central zone by horizontally drawing it across the surface of a bath of molten metal of greater density than the glass contained in the canal, this thinning of the glass taking place by the sliding of the central zone of relatively low viscosity between the marginal zones of higher viscosity. The marginal zones are subjected to very little drawing on account of their higher viscosity, and the reduction in width of the sheet under the combined action of the drawing forces and the surface tension of the glass is relatively small.

(5) In regulating the cooling and the speed of drawing in order to obtain the desired thickness.

(6) In maintaining for several instants the surface of the central continuous sheet in the zones of softening is then causing its hardening so as to be able to disengage it from the bath which supports it and to convey it into an annealing lehr without damaging its surfaces.

It will be apparent that the above process differs greatly from that in which the same initial regularized current of glass is utilized to directly produce a hardened continuous sheet. In other words, the current of glass is subjected to uniform transverse cooling and is not drawn in an appreciable manner, so that a sheet of uniform thickness across its width is produced. The minimum thickness of such a sheet is realtively large, that is, about 6 mm. or approximately equilibrium thickness.

The process of the present invention is essentially based on the creation in a uniform current of liquid glass of small thickness, of the required thermal conditions for direct drawing, that is to say a differentiated cooling of the marginal zones and the central zone, the drawing being accomplished without the necessity of maintaining the marginal zones by mechanical devices as is obligatory in the vertical drawing practiced at the present time.

To clarify the ideas, it is proper to recall that the inital current of liquid glass possesses a viscosity of less than 500 poises, which implies for industrial soda-calcic glasses, a temperature greater than 1300° C. approximately. It is proper to note also that such a current having a thickness of 8 millimeters possesses a speed in excess of 150 meters an hour.

Direct drawing from a thin layer of liquid glass is of interest because:

(1) It represents a definite saving in means and energy over horizontal drawing from a polished plastic continuous sheet derived from an intermediate continuous sheet "calibrated" between solid cooled rollers.

(2) It is superior to the processes of direct drawing of liquid glass in the sense that the effects of gravity are neutralized so that drawing in accordance with the invention is effected with much less effort for the same speed of production, which makes it possible to attenuate defects such as striations and hammer effect on the surfaces.

Furthermore, horizontal drawing according to the process of the invention makes it possible to achieve, with the same thickness, considerably higher speeds than those obtained in vertical drawing with or without bending.

As has been stated previously, in accordance with the invention a current of liquid glass of small uniform thickness obtained in the head of the utilization canal supplies the drawing compartment. The marginal edge zones of this current are subjected on their three surfaces, namely upper surface, edge surface and lower surface, to forceful cooling means. A short distance above each marginal edge zone there is operated a water screen or cooler. The surface of this water screen facing the central zone of the current, in order not to cool the central zone, carries a covering having a very low factor of emission, preferably a polished metallic coating such as chromium plating, silver plating, gold plating, etc. Since the atmosphere of the utilization canal is nonoxidizing, this metallic covering retains its low factor of emission. The graphite border which contains the metal bath melted on the surface cools the edge of the current by radiation. The rear surface of this border is in contact with a circulating water box. The lower surface of each marginal zone is cooled by contact with the tin bath, near the surface of which is immersed a water circulation tube.

The small height of the supply current (in general included between about 6 and 8 millimeters) causes the marginal zones to be cooled in an extremely rapid manner. This makes it possible to limit the contraction in width of the glass layer and the diminution of the thickness of the marginal zones by flowing.

The central zone is cooled in a less rapid manner by placing water screens above it and by supporting it on a bath of molten metal whose temperature is lowered by means of cooler tubes which are submerged therein. The active surface of the water screens may have local deposits with different emission factors in order to obtain a good crosswise distribution of the temperature in the central zone of the continuous sheet.

Although the cooling between the marginal zones and the central zone is as sharply separated as possible, there exists transversely two transition zones of a certain width in which the thickness diminishes progressively from the thickness of the edges on to the uniform thickness of the central zone. The cutting loss occasioned by these two transition zones has, however, a very limited importance.

The thickness of the continuous sheet which results from the drawing according to the process of the invention evidently depends on the drawing effort due to the friction between the solidified zone of the continuous sheet and the traction rollers on which it rests in the annealing lehr, as well as on the speed of cooling of the central zone of the glass current. As in the case of the usual drawing, the larger this speed of cooling, the larger is the speed of production of the continuous sheet for a given thickness. Of course, the speed of production of the continuous sheet obtained according to the process of the invention depends principally on the speed of the current of liquid glass at the entrance of the utilization canal. It being given that this supply current can exceed the speed of 150 meters per hour when its height is 8 millimeters, it is not surprising to find that the speed of production of a continuous sheet of a thickness of two millimeters exceeds 500 meters an hour.

The present invention will be better understood in referring to the attached drawing which shows as a non-limiting example and in a diagrammatic manner, the devices for applying the processes according to the invention and on which:

FIG. 1 represents a vertical longitudinal section of a production installation unit for drawing a continuous sheet with a thickness included between 2 and 6 millimeters approximately;

FIG. 2 is a plan view of the above installation unit, with the superstructure above the level of the surface of the bath removed;

FIGS. 5 and 6 represent, on an enlarged scale, cross-sections of the drawing chamber along lines V—V and VI—VI, respectively, of FIG. 3a.

Figure 3A:
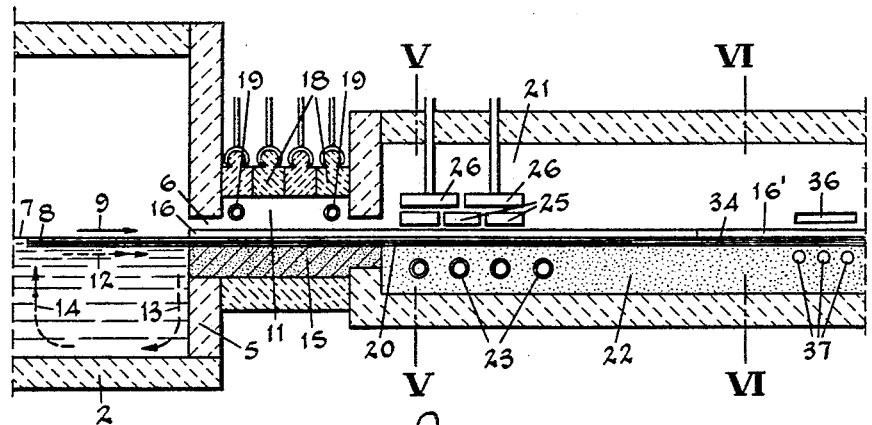
FIG. 3a represents on a larger scale the longitudinal vertical section of the part of the installation included between the "hot spot" of the melting furnace and the place where the drawing of the continuous sheet is practically terminated.

In FIG. 1, the tank 2 of the melting furnace 1 extends in a longitudinal direction from the vertical wall 4, situated below the stoking opening 3, to the vertical wall 5 in which there is located the discharge sill 6 for the refined glass. The surface of the glass bath in the tank 2 is represented by the horizontal line 7.

In accordance with the general arrangements previously described by the applicant in the French patent application No. 951,540, filed Oct. 23, 1963, the "hot spot" 8 of the surface 7 is at a short distance from the sill 6.

The surface current of refined glass intended to be drawn to form the continuous sheet is indicated by the arrows 9. This current has a small thickness and a large speed. It leaves from the "hot spot" 8 and, crossing the sill 6, it enters into the regularization zone 11 of the utilization canal, in which, thanks to the floor 15 and the lateral walls 16 (see FIGS. 3 and 4) of graphite which it does not wet, it is practically not disturbed by exterior forces of friction.

The current 9 rests on the subjacent current 12 which belongs to the standard convection circuit which exists between the vertical of the "hot spot" and the terminal wall 5 and which is shown diagrammatically by the arrows in dashes 12, 13 and 14.

The zone of regularization 11 is covered by the reflecting and insulating crown 17 which is made of refractory bricks 18 joined together (see FIG. 3a). By choosing the nature of these bricks (that is to say the reflection factor of their surfaces) and in regulating their height above the current of glass, the transverse distribution of speeds in the current 9 is made uniform, so that at the extremity of the floor 15 a uniform current 20 is obtained having a low viscosity (greater than 500 but substantially less than $10^7$ C.G.S. units) and a uniform thickness which is substantially equilibrium thickness, or 6 to 8 mm. This current, when subjected to differentiated cooling and after the drawing of its central zone, will become the continuous sheet having a thickness included between approximately 2 and 6 millimeters by the process according to the invention.

The atmosphere of the zone of regularization 11 is maintained non-oxidizing by supplying through the tubes 19 (see FIG. 3a) pure nitrogen or a mixture of nitrogen and hydrogen.

Upon leaving the zone of regularization the current 20 penetrates into the drawing zone 21 of the utilization canal. The lower surface of this current comes to rest on the bath of melted tin 22 which is maintained at a relatively low temperature by means of cooler tubes 23. The marginal zones 24 (see FIG. 5) are subjected to the conjoined action of the water circulation boxes 25, the borders 16 of graphite cooled by the tubes 27 and the tubes 28 immersed in the tin bath in the neighborhood of the surface. They are thus cooled sufficiently to achieve a viscosity in excess of about $10^9$ C.G.S. units as aforementioned. The upper surface of the central zone 33 (FIG. 5) of the glass current 20 is cooled to a lesser extent by water circulation boxes 26 so as to achieve a viscosity not greater than about $10^7$ C.G.S. units.

Figure 6:
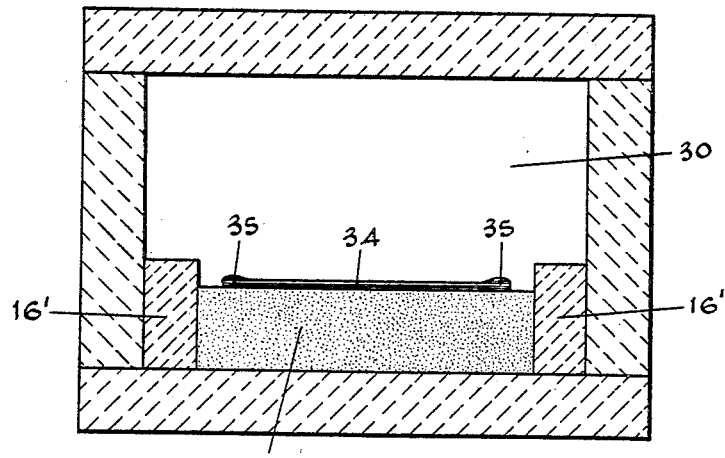

The drawing commences as soon as the glass arrives on the tin bath 22, and ends beyond the water screens 26. The layer of glass 20 is then transformed into a hardened continuous sheet 34 of lesser thickness which has two margins of greater thicknesses 35 (FIG. 6).

After drawing, the surfaces of the continuous sheet are eventually softened during a few instants in order to regularize the planimetry, this being obtained thanks to a transverse non-oxidizing sweeping of the upper surface by hot gases coming from the nozzle 36 and by heating, by means of the resistors 37, of the tin which is in contact with the lower surface. The continuous sheet is then sufficiently hardened in the zone 30 where the atmosphere is non-oxidizing, as in the drawing zone 21, thanks to the arrival of pure nitrogen or of a mixture of nitrogen and hydrogen through the tubes 31.

From the surface of the tin bath 22, the continuous sheet passes onto the roller 29 and then traverses the annealing lehr 12 carried by the tractor rollers 38. On leaving the annealing lehr, the continuous sheet is carried on the rollers 39 before undergoing cutting.

In FIG. 2, the "hot spot" is represented by the cross-hatched region 8, from which radiate the surface currents which move towards the side walls and towards the terminal wall 5 of the tank. The currents represented by the arrows 9 in solid lines enter into the zone of regularization 11 of the utilization canal. The currents represented by the arrows 10 in discontinuous lines are not used.

The graphite borders 16 of the utilization canal are distinctly visible. They extend into the drawing zone 21. Since the drawing slightly diminishes the width of the continuous sheet, it no longer comes in contact with the borders so that in the zone of final hardening, borders 16' of refractory material can be substituted for the graphite borders. It will be apparent that the thinned continuous sheet 34, including the marginal zones 35, is somewhat narrower than the supply current.

Figure 3B:
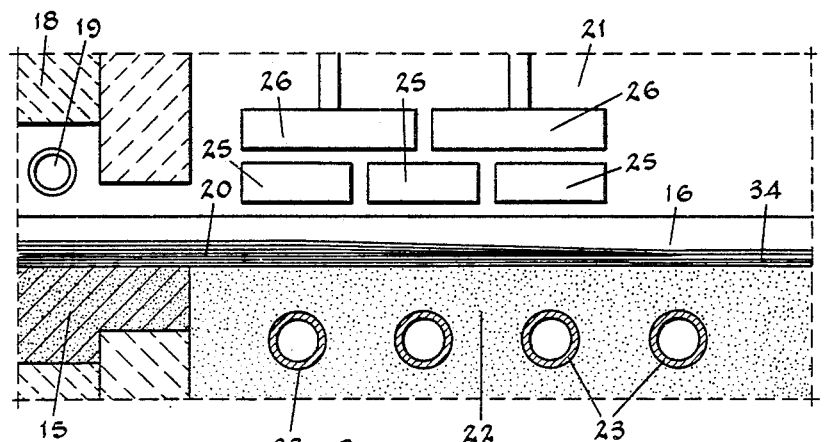
FIG. 3b represents on a larger scale the vertical longitudinal section of the part of the installation in which the thinning of the central zone of the continuous sheet is produced.

In FIG. 3b, the progressive diminution of the thickness of the central zone 33 of the current 20 can be clearly seen. After drawing, it becomes the thinned and hardened continuous sheet 34.

Figure 4:
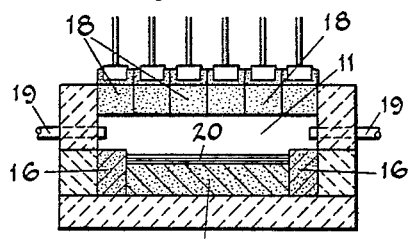
FIG. 4 represents a cross-section along IV—IV of FIG. 3a at the head of the utilization canal.

In FIG. 4, the current 20 of small height and large speed moves in contact with the graphite floor 15 and the lateral walls, also of graphite. The tubes 19 of refractory material introduce into the chamber 11, nitrogen or a mixture of nitrogen and hydrogen which prevents the oxidation of the graphite. The blocks 18 of the crown can be moved vertically with respect to each other in order to regulate the transverse distribution of the temperature in the current 20.

Figure 5:
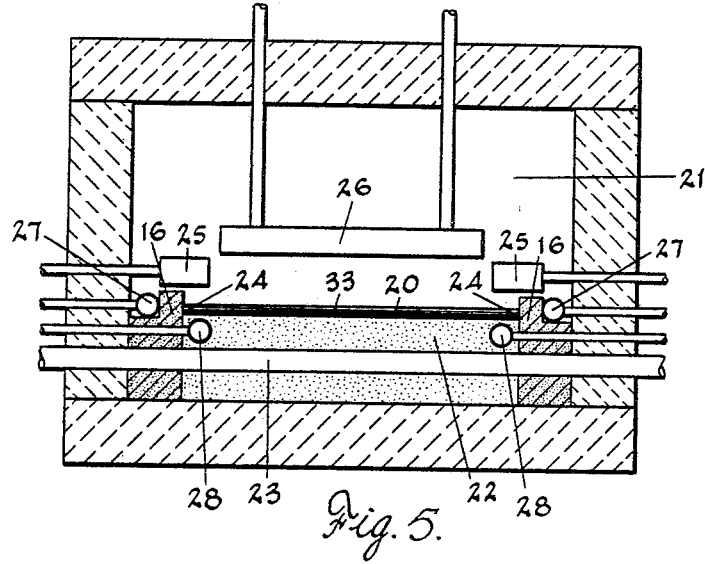

In FIG. 5, it is shown that the current which comes out of the zone of regularization is subjected in the drawing chamber 21 to an energetic cooling of its marginal zones 24 by the simultaneous intervention of the water screens 25, the borders 16, behind which are located cooling tubes 27, and the tin bath cooled by the tubes 28. These marginal zones are relatively strongly hardened, to a viscosity exceeding $10^9$ C.G.S. units, when the central zone is moderately hardened to a viscosity below $10^7$ C.G.S. units by radiation from the boxes 26 and by contact with the tin bath cooled by the tubes 23.

As illustrated in FIG. 6, the continuous sheet which results from drawing possesses a central zone 34 of uniform thickness less than about 6 millimeters, and two marginal zones whose thickness differs little from the initial, substantially equilibrium thickness of 6 to 8 mm. of the supply current 20. Between the central zone and the marginal zones there are two intermediate zones where the thickness of the glass changes rapidly. Under the effect of drawing and also under the effect of the drop in temperature, the continuous sheet experiences a slight contraction. Its edges are at a certain distance from the borders 16', which can then be of refractory material.

The process according to the invention makes it possible to obtain a drawn continuous sheet whose surfaces, provided with a "fire polish," possess a remarkable planimetry compared to that of continuous sheets of the same thickness obtained by the technique of direct vertical drawing from the liquid glass. At a thickness of about 3 millimeters, the sheets cut from the new continuous drawn sheets rival the thin plate glass sheets polished mechanically to make the "sandwich" glazing of automotive vehicles.

I claim:
1. In a method of producing a continuous glass sheet with flat fire polished surfaces from a mass of molten glass in a tank heated to create a "hot spot" from which a current of surface glass flows at an accelerated rate; the improvement comprising the steps of channeling a portion of the molten glass from said surface current into a thin stream of uniform thickness and less width than said mass away from said tank and onto a bath of molten metal, cooling the margins of said stream as it reaches said molten metal bath and cooling the center of said stream as it reaches said molten metal bath to from marginal zones of low viscosity and a central zone of viscosity lower than that at said marginal zones, and drawing a continuous sheet of glass horizontally from said stream over the surface of said bath of molten metal whereby the thickness of said central zone is reduced substantially below that of said margins.

2. A method as defined in claim 1 in which said stream is between 6 and 8 millimeters in depth.

3. A method as defined in claim 1 in which the molten glass in said surface current is channeled by contact with surfaces which it does not wet.

4. A method as defined in claim 1 in which the temperature of the glass in said stream is above 1300° C.

5. A method as defined in claim 1 in which the cooling of said stream and the speed of drawing said sheet are regulated to control the ultimate thickness of said sheet.

6. A method as defined in claim 1 in which said continuous sheet is drawn over said bath of molten metal until said central zone attains a thickness between 2 and 6 mm. and is then removed therefrom.

7. A method as defined in claim 1 in which said sheet is drawn over said bath of molten metal until it has attained its final thickness and has hardened, and the surfaces of said hardened sheet are then reheated and subsequently cooled before removing it from said bath of molten metal.

8. A method as defined in claim 1 in which after said stream is cooled said marginal zones have a viscosity in excess of $10^9$ C.G.S. units and said central zone has a viscosity of less than $10^7$ C.G.S. units.

9. A method as defined in claim 8 in which said continuous sheet is drawn over the surface of said bath of molten metal until said central zone has attained a thickness between about 2 and 6 mm. and said marginal zones are substantially unchanged from their original thickness of 6 to 8 mm.

References Cited

UNITED STATES PATENTS

| 2,911,759 | 11/1959 | Pilkington et al. | 65—65 |
| 3,183,072 | 5/1965 | Long | 65—137 |
| 3,251,667 | 5/1966 | Touvay | 65—65 X |
| 3,266,880 | 8/1966 | Pilkington | 65—99 |
| 3,316,077 | 4/1967 | Plumat | 65—65 |
| 3,301,651 | 1/1967 | Long | 65—203 X |

S. LEON BASHORE, Primary Examiner

EDWARD R. FREEDMAN, Assistant Examiner

U.S. Cl. X.R.

65—65A, 90, 182